No. 773,231. PATENTED OCT. 25, 1904.
C. R. SMITH.
CARBURETER.
APPLICATION FILED OCT. 26, 1903.
NO MODEL.
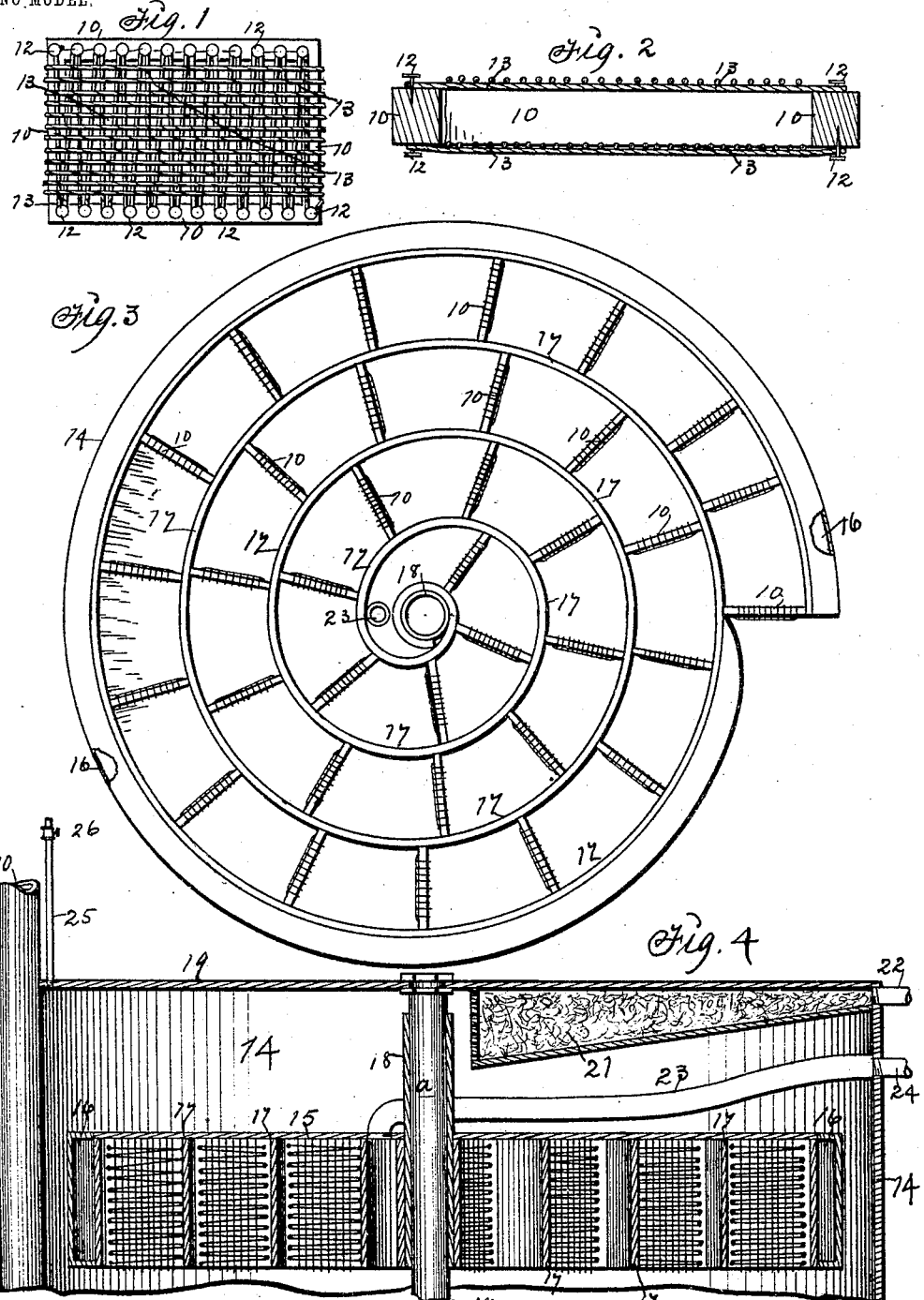
Witnesses:
L. L. Leibrock
R. H. Orwig
Inventor: Charles R. Smith,
By Thomas G. Orwig, Attorney.

No. 773,231.  
Patented October 25, 1904.

UNITED STATES PATENT OFFICE.

CHARLES R. SMITH, OF MANILLA, IOWA, ASSIGNOR TO THE GASOLINE GAS LIGHTING COMPANY, OF DES MOINES, IOWA.

CARBURETER.

SPECIFICATION forming part of Letters Patent No. 773,231, dated October 25, 1904.

Application filed October 26, 1903. Serial No. 178,606. (No model.)

*To all whom it may concern:*

Be it known that I, CHARLES R. SMITH, a citizen of the United States, residing at Manilla, in the county of Crawford and State of Iowa, have invented a new and useful Improvement in Carbureters, of which the following is a specification.

My object is to simplify the construction and improve the efficiency of a carbureter, to diminish the time required to volatilize oil and carburet air in a vessel of any given size, and to filter the product to produce an illuminating-gas as required of uniform richness.

My invention consists in the construction, arrangement, and combination of elements as hereinafter set forth, pointed out in my claims, and illustrated in the accompanying drawings, in which—

Figure 1 is a side view of an oil lifter and distributer; and Fig. 2 is an enlarged transverse sectional view of Fig. 1, and jointly considered these views show the manner of constructing the device. Fig. 3 shows a plurality of the devices combined to produce a float adapted to be inclosed in a carbureter vessel, and the view shows the float in an inverted position. Fig. 4 is a transverse sectional view of a carbureter vessel and the float and a filter combined therewith as required for practical use.

The numeral 10 designates a wooden frame that may vary in size as desired. Rows of tacks or nails 12 are fixed in the wood as shown or in any suitable way as required for coiling a single length of a flexible cord 13, made of textile material, on the nails in crossed position, so the parts extending laterally and longitudinally will be in contact with each other and adapted to absorb oil and by capillary attraction lift oil and distribute it to a current of air as required to hasten volatilizing the oil and carbureting air that passes through and over the device. It is obvious a strip of woven textile fabric may be used in place of the cord 13.

A float consisting of an open-bottomed sheet-metal case 14, having a closed top 15 and a closed annular air-chamber 16 and a convolute partition 17 and a center sleeve 18, is fitted in a carbureter vessel 19, as shown in Fig. 4, or in any suitable way, and a post *a*, preferably in the form of a tube, is extended through the sleeve 18 to retain the float perpendicular and in concentric position with the vessel. By means of the convolute partition a long passage-way is produced in a small case, which is of great advantage in the art. By thus forming the partition 17 of a single piece the labor and expense of construction are greatly reduced.

A pipe 20 is connected with the vessel 19 for conveying oil into the vessel, and a filter 21, filled with mineral wool or other suitable material, is fixed in the top of the vessel and perforated at its inner and large end to admit gas, and a pipe 22 is connected with its outer and small end for conveying filtered and purified gas to burners.

A flexible tube 23 is connected with the top and central portion of the convolute chamber and passage-way for air and a pipe 24 connected with the vessel and the tube 23, as shown or in any suitable way as required, to force air into the center of the convolute chamber and through the plurality of the oil lifters and distributers fixed in the passage-way, as shown in Figs. 3 and 4.

A pipe 25, provided with a valve 26, is connected with the top of the vessel 19 to allow air and gas to escape while oil is being filled into the vessel through the pipe 20.

In the practical use of my invention when gasolene is in the vessel 14 the float having the annular air-chamber 16 is thereby made buoyant and will rise in the vessel 14 and descend as the oil is volatilized, and the air forced through the tube 23 will go through the plurality of oil lifters and distributers and the convolute passage and into the carbureter vessel and be pressed through the filter 21 to be conveyed to burners through a pipe 22, connected with the small end of the filter, and in passing through the filter it will be purified and made uniform in richness or quality.

Having thus described the purpose of my invention and its construction and operation, the practical utility thereof will be readily un- derstood by persons familiar with the art to which it pertains, and

What I claim as new, and desire to secure by Letters Patent, is—

1. In a carbureter, a convolute partition complete in one piece to produce a continuous volute chamber that is open at both ends and also open at its bottom, a plurality of oil lifting and distributing devices, adapted to allow the passage of air through them fixed in said chamber and a volute air-chamber fixed around the circumference of the vessel, a filter in the vessel and means to force air into the center of said chamber, to operate in the manner set forth for the purposes stated.

2. In a carbureter, a plurality of oil-lifters composed of wooden frames having rows of nails fixed in their parallel sides, a cord of textile material placed on the nails and around the frame in crossed position, a vessel for air and oil, a convolute partition fixed in the vessel to produce a lengthy passage-way for air and oil and the oil-lifters fixed in said passage-way, as shown and described, for the purposes stated.

3. In a carbureter, a carbureter vessel having a fixed post in its center, a float having an annular air-chamber at its circumference, a sleeve in its center and on said post, a partition fixed in the float to produce a chamber and convolute passage-way for conveying air, a tube connected with the inner end of the passage-way for forcing air into the said passage-way that is open at its outer end, a plurality of oil lifters and distributers fixed in the convolute passage-way and a filter fixed in the top of the carbureter vessel to extend from the circumference to the center, arranged and combined to operate in the manner set forth for the purposes stated.

4. In a carbureter, a carbureter vessel having a fixed post in its center, a float having an annular air-chamber at its circumference, a sleeve in its center and on said post, a convolute partition in the float to produce a chamber and convolute passage-way in the float for conveying air, a tube connected with the inner end of the passage-way for forcing air into the said passage-way that is open at its outer end, a plurality of oil lifters and distributers fixed in the convolute chamber and passage-way, a filter fixed in the top of the carbureter vessel to extend from the circumference to the center, a pipe connected with the carbureter vessel for conveying oil into the vessel and means for conveying gas from the filter, arranged and combined to operate in the manner set forth for the purposes stated.

CHARLES R. SMITH.

Witnesses:
W. A. YEAGER,
E. M. SMITH.